United States Patent
Tomii

(10) Patent No.: US 10,078,290 B2
(45) Date of Patent: Sep. 18, 2018

(54) IMAGE FORMING APPARATUS PERFORMING CALIBRATION, AND CONTROL METHOD THEREFOR

(71) Applicant: CANON KABUSHIKI KAISHA, Tokyo (JP)

(72) Inventor: Hiroshi Tomii, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/872,052

(22) Filed: Jan. 16, 2018

(65) Prior Publication Data
US 2018/0231910 A1    Aug. 16, 2018

(30) Foreign Application Priority Data
Feb. 13, 2017    (JP) ................ 2017-024015

(51) Int. Cl.
G03G 15/043    (2006.01)
G06K 15/02    (2006.01)
H04N 1/00    (2006.01)
H04N 1/405    (2006.01)

(52) U.S. Cl.
CPC ......... G03G 15/043 (2013.01); G06K 15/027 (2013.01); H04N 1/00761 (2013.01); H04N 1/4052 (2013.01)

(58) Field of Classification Search
CPC .. G03G 15/043; H04N 1/4052; H04N 1/6033; H04N 1/00761; H04N 1/00023; G06K 15/027
See application file for complete search history.

(56) References Cited

U.S. PATENT DOCUMENTS 8,755,100 B2 * 6/2014 Tomii ................ H04N 1/00023
358/518
2010/0086201 A1 * 4/2010 Muto ................... H04N 1/6033
382/162

FOREIGN PATENT DOCUMENTS

JP        2003156888 A    5/2003

* cited by examiner

*Primary Examiner* — Hoang Ngo
(74) *Attorney, Agent, or Firm* — Rossi, Kimms & McDowell LLP

(57) ABSTRACT

An image forming apparatus that enhances measurement accuracy of a pattern image and improves quality of a printed image. Light emitted from a light emission unit based on a first measurement condition is reflected from an image bearing member, and first information is generated based on a measurement result of the image bearing member. Second information is determined based on the first measurement condition, the first information, and a second measurement condition. Light is emitted based on the first measurement condition when a first measurement image is measured, and an image forming condition is generated based on a measurement result of the first measurement image and the first information. Light is emitted based on the second measurement condition when a second measurement image is measured, and the image forming condition is generated based on a measurement result of the second measurement image and the second information.

10 Claims, 13 Drawing Sheets

| DATA NUMBER n | REFLECTED LIGHT OUTPUT WITH LIGHT AMOUNT L1 L1B(i) |
|---|---|
| 0 | 927 |
| 1 | 926 |
| 2 | 918 |
| ... | ... |
| 909 | 880 |

| DATA NUMBER n | REFLECTED LIGHT OUTPUT WITH LIGHT AMOUNT L2 L2B(i) |
|---|---|
| 0 | 1854 |
| 1 | 1852 |
| 2 | 1836 |
| ... | ... |
| 909 | 1760 |

FIG. 12A

| DENSITY OF PATTERN IMAGE | ACCURACY OF MEASUREMENT DENSITY WITH LIGHT AMOUNT L1 | ACCURACY OF MEASUREMENT DENSITY WITH LIGHT AMOUNT L2 |
|---|---|---|
| 0.2 | 0.010 | 0.005 |
| 0.4 | 0.014 | 0.007 |
| 0.6 | 0.021 | 0.010 |
| 0.8 | 0.023 | 0.011 |
| 1.0 | 0.028 | 0.014 |
| 1.2 | 0.036 | 0.018 |
| 1.3 | 0.044 | 0.022 |
| 1.6 | 0.052 | 0.026 |

FIG. 12B

| DENSITY OF PATTERN IMAGE USED IN GRADATION CORRECTION CONTROL | LIGHT AMOUNT IS NOT CHANGED | | FIRST EMBODIMENT | |
|---|---|---|---|---|
| | LIGHT AMOUNT | MEASUREMENT ACCURACY | LIGHT AMOUNT | MEASUREMENT ACCURACY |
| 0.2 | L1 | 0.010 | L1 | 0.010 |
| 0.4 | L1 | 0.014 | L1 | 0.014 |
| 0.6 | L1 | 0.021 | L2 | 0.010 |
| 0.8 | L1 | 0.023 | L2 | 0.011 |
| 1.0 | L1 | 0.028 | L2 | 0.014 |
| 1.2 | L1 | 0.036 | L2 | 0.018 |
| 1.3 | L1 | 0.044 | L2 | 0.022 |
| 1.6 | L1 | 0.052 | L2 | 0.026 |

| DENSITY OF PATTERN IMAGE USED IN Dmax CONTROL | LIGHT AMOUNT | MEASUREMENT ACCURACY | LIGHT AMOUNT | MEASUREMENT ACCURACY |
|---|---|---|---|---|
| 1.6 | L1 | 0.052 | L2 | 0.026 | ved
IMAGE FORMING APPARATUS PERFORMING CALIBRATION, AND CONTROL METHOD THEREFOR

BACKGROUND OF THE INVENTION

Field of the Invention

The present invention relates to a calibration technique of an image forming apparatus.

Description of the Related Art

Generally, an image forming apparatus performs calibration to correct deviation between target density and density of an actually printed image owing to a change of an environment around the apparatus or secular changes of parts of the apparatus. It is important to reduce deviation of density also in a color image forming apparatus because a color balance (what is called a color tone) varies when image density of each color shifts. In calibration, a pattern image formed on an image bearing member is measured. Then, image forming conditions are adjusted so that density of an output image becomes target density. It should be noted that the image forming conditions include an exposure, developing bias, and a γ correction table. The exposure and the developing bias are controlled in order to correct the maximum density. The γ correction table is generated in order to correct a gradation characteristic of an image.

An optical sensor method that is mainly used by the above-described image density control is roughly divided into two types including an irregular reflection type and a specular reflection type. An optical sensor of the specular reflection type detects specular reflection light with a light receiver for detecting specular reflection light that is arranged opposite to a light source with respect to a normal line of an irradiated surface. On the other hand, an optical sensor of the irregular reflection type detects diffused light from the light source with a light receiver for detecting irregular reflection light.

A pattern image is formed on an image bearing member, for example. Since carbon black is generally distributed into an image bearing member to adjust resistance, the image bearing member has high smoothness and glossiness. Then, the color of the image bearing member is black or deep gray. Since the sensor of the specular reflection type measures the reflected light from the image bearing member, density is measurable even if black toner is used. When image density is controlled, an image forming condition is generated on the basis of a measurement result of the pattern image and a measurement result of the image bearing member.

An image forming apparatus disclosed in Japanese Laid-Open Patent Publication (Kokai) No. 2003-156888 (JP 2003-156888A) detects intensities of two reflected light components including the regular reflection component and irregular reflection component, compares density of the surface of an image bearing member and density of a toner image, and achieves calibration on the basis of an image forming condition obtained by a comparison calculation. The image forming apparatus of this publication controls a light source so as to keep the same irradiation light amount in both of a case where the density of the surface of the image bearing member is obtained and a case where the density of the toner image that is formed at the same position of the image bearing member is obtained.

Incidentally, it is important to make the irradiation light amount become proper in order to stabilize a detection accuracy. When the irradiation light amount is too high, a reflected light amount increases too much and an output value of a light receiving element is saturated, which disable correct detection of density. On the other hand, when an irradiation light amount is too low and a reflected light amount decreases too much, output variation of the light receiving element in response to density variation of a pattern image becomes small, which enlarges an error of a value that is converted from the density.

A pattern image used in gradation correction control is generally formed with a plurality of gradations. Since variation of the output of the light receiving element in response to variation of gradation of the pattern image becomes small in a high-density area of the pattern image, an error of a value that is obtained by converting the density of a detection result in the high-density area becomes large under a low irradiation light amount. On the other hand, when the irradiation light amount is always high, the reflected light amount from a low-density area of the pattern image or from the image bearing member becomes so large that the output value of the light receiving element is saturated, which disturbs correct detection of the density. Namely, it was difficult to accurately detect density of a pattern image in a wide density range.

Moreover, development-contrast compensation needs a high-density pattern image in general. An error becomes large when the high-density pattern image is measured with a low irradiation light amount. Accordingly, when the pattern image for the development-contrast compensation and the pattern image for the gradation correction are measured with the same irradiation light amount, density determination accuracy of the pattern image for the development-contrast compensation becomes low. Accordingly, it is important to set up the irradiation light amount appropriately in order to raise the density determination accuracy of the pattern image and to improve quality of a printed image.

SUMMARY OF THE INVENTION

The present invention provides a technique that sets up an irradiation light amount appropriately to improve measurement accuracy of a pattern image and improves quality of a printed image.

Accordingly, a first aspect of the present invention provides an image forming apparatus that forms an image on a sheet, the image forming apparatus includes an image bearing member, an image forming unit configured to form an image on the image bearing member, a light emission unit, a measurement unit configured to measure reflected light from a measurement image formed on the image bearing member, and a controller configured to control the image forming unit to form measurement images, to control the light emission unit to emit light, to control the measurement unit to measure reflected light from the measurement images, and to generate an image forming condition based on measurement results of the measurement images and information related to a measurement result of the image bearing member. The controller controls the light emission unit to emit light based on a first measurement condition, and controls the measuring unit to measure the reflected light from the image bearing member, and determines first information corresponding to the first measurement condition based on the measurement result of the image bearing member. The controller determines second information corresponding to a second measurement condition based on the first measurement condition, the first information, and the second measurement condition. Light intensity corresponding to the second measurement condition is more than light intensity corresponding to the first measurement condition. The controller controls the light emission unit to emit light based on the first measurement condition in a case where the measurement unit measures a first measurement image based on the first measurement condition, and generates the image forming condition based on a measurement result of the first measurement image and the first information. The controller controls the light emission unit to emit light based on the second measurement condition in a case where the measurement unit measures a second measurement image based on the second measurement condition, and generates the image forming condition based on a measurement result of the second measurement image and the second information.

Accordingly, a second aspect of the present invention provides a control method for an image forming apparatus that forms an image on a sheet, the control method including controlling an image forming unit to form a measurement image on an image bearing member, controlling a light emission unit to emit light, controlling a measurement unit to measure reflected light from the measurement image, and generating an image forming condition based on a measurement result of the measurement image and information related to a measurement result of the image bearing member. The measurement unit measures light emitted from the light emission unit based on a first measurement condition and is reflected from the image bearing member, and first information corresponding to the first measurement condition is generated based on the measurement result of the image bearing member. Second information corresponding to a second measurement condition is determined based on the first measurement condition, the first information, and the second measurement condition. Light intensity corresponding to the second measurement condition is more than light intensity corresponding to the first measurement condition. The light emission unit emits light based on the first measurement condition in a case where the measurement unit measures a first measurement image based on the first measurement condition, and the image forming condition is generated based on a measurement result of the first measurement image and the first information. The light emission unit emits light based on the second measurement condition in a case where the measurement unit measures a second measurement image based on the second measurement condition, and the image forming condition is generated based on a measurement result of the second measurement image and the second information.

According to the present invention, an irradiation light amount is set up appropriately, which improves the measurement accuracy of a pattern image and improves the quality of the printed image.

Further features of the present invention will become apparent from the following description of exemplary embodiments with reference to the attached drawings.

BRIEF DESCRIPTION OF THE DRAWINGS

FIG. 12A is a view showing the measurement accuracies in a case where measurement images of various gradations of the pattern image are measured with a low irradiation light amount in comparison with the measurement accuracies in a case where the measurement images are measured with a high irradiation light amount with the image forming apparatus shown in FIG. 1. FIG. 12B is a view showing the measurement accuracies of the measurement images of various gradations of the pattern image in the first embodiment in comparison with the measurement accuracies of the measurement images of various gradations of the pattern image in the low irradiation light amount.

DESCRIPTION OF THE EMBODIMENTS

Hereafter, embodiments according to the present invention will be described in detail with reference to the drawings.

Figure 1:
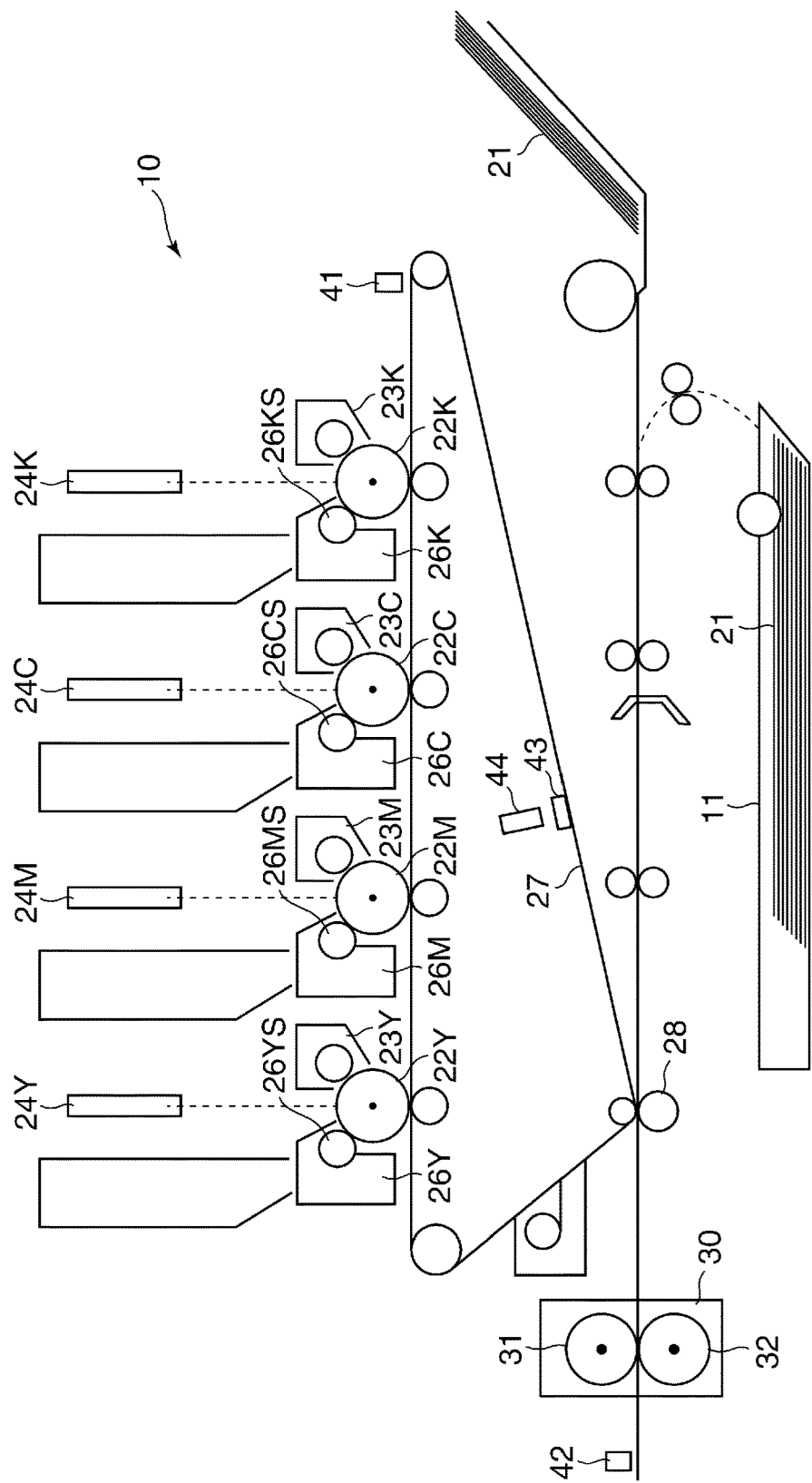
FIG. 1 is a view showing a configuration of a printer of an image forming apparatus according to a first embodiment of the present invention.

FIG. 1 is a view showing a configuration of a printer of an image forming apparatus according to a first embodiment of the present invention. The image forming apparatus is a color image forming apparatus (printer) of an electrophotographic system. The printer 10 has four stations for forming images of four colors including yellow (Y), magenta (M), cyan (C), and black (K).

The printer 10 is provided with laser light sources 24Y, 24M, 24C, and 24K, photosensitive drums 22Y, 22M, 22C, and 22K, electrostatic chargers 23Y, 23M, 23C, and 23K, and development devices 26Y, 26M, 26C, and 26K corresponding to the four colors. Moreover, the development devices 26Y, 26M, 26C, and 26K are respectively provided with sleeves 26YS, 26MS, 26CS, and 26KS.

The photosensitive drums 22Y, 22M, 22C, and 22K are constituted by applying an organic photoconductive layer to a periphery of an aluminum cylinder, and are rotated by driving force of a drive motor (not shown). This drive motor rotates the photosensitive drums 22Y, 22M, 22C, and 22K counterclockwise in FIG. 1 in response to an image forming operation. The laser light sources 24Y, 24M, 24C, and 24K emit light beams according to digital signals from a reader (not shown) to form electrostatic latent images on the photosensitive drums 22Y, 22M, 22C, and 22K that were uniformly electrified by the electrostatic chargers 23Y, 23M, 23C, and 23K, respectively. The electrostatic latent images formed on the photosensitive drums 22Y, 22M, 22C, and 22K are visualized as toner images by the development devices 26Y, 26M, 26C, and 26K.

An intermediate transfer belt 27, which is an intermediate transfer medium and also an image bearing member, rotates clockwise in synchronization with rotations of the photosensitive drums 22Y, 22M, 22C, and 22K. Moreover, the intermediate transfer belt 27 contacts with the photosensitive drums 22Y, 22M, 22C, and 22K. The toner images on the photosensitive drums 22Y, 22M, and 22C and 22K are transferred to the intermediate transfer belt 27 at contact portions. The intermediate transfer belt 27 is a monolayer resin conveyor belt that is made from polyimide with a circumference of 895 mm. Moreover, a proper quantity of carbon particulates are distributed into the resin for adjusting resistance of the belt. Accordingly, the intermediate transfer belt 27 is black, and has high smoothness and glossiness. Rotational speed of the intermediate transfer belt 27 is set up in 246 mm/sec as well as process speed.

An HP (home position) mark 43 attached to the intermediate transfer belt 27 is detected by an HP detection sensor 44 by every one round of the intermediate transfer belt 27. A phase of the intermediate transfer belt 27 can be specified by the elapsed time from the timing at which the HP mark 43 was detected. This allows adjustment of the relative relation between the position of a pattern image P1 (FIG. 5) formed on the intermediate transfer belt 27 and the phase of the intermediate transfer belt 27. Moreover, an optical pattern sensor 41 for measuring the pattern image P1 is arranged opposite to the intermediate transfer belt 27 at a downstream side of the transfer section, i.e., the contact position between the photosensitive drum 22K and the intermediate transfer belt 27.

The multicolor toner image supported by the intermediate transfer belt 27 is transferred to a sheet 21 that is conveyed from a feeding unit 11 and is conveyed while being nipped between the intermediate transfer belt 27 and a roller of a transfer unit 28. After that, a heat fixing process is applied to the toner image transferred to the sheet 21 by a heating roller 31 and a pressure roller 32 of a fixing unit 30. When the sheet 21 to which the toner image was fixed is ejected from the fixing unit 30, the sheet 21 is detected by an ejection sensor 42 and is ejected out of the apparatus.

Figure 2:
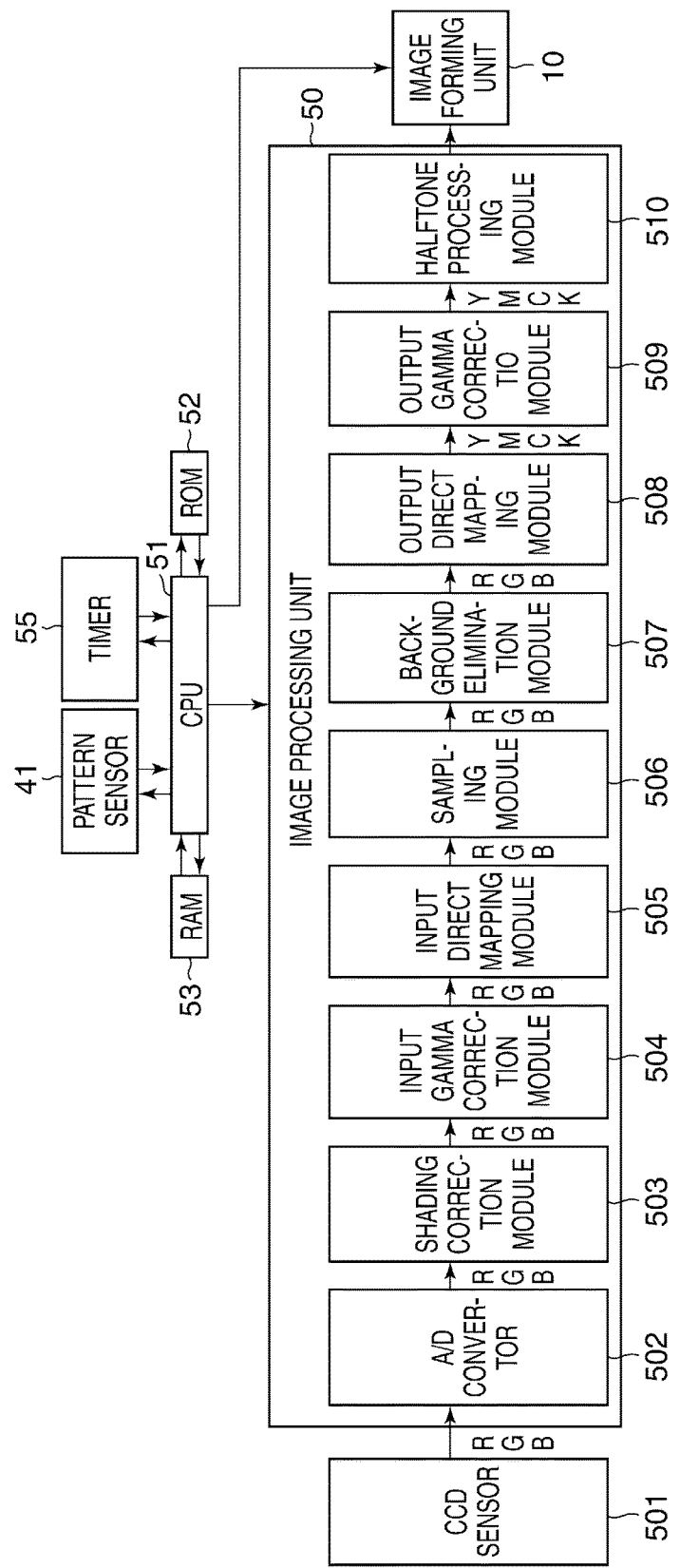
FIG. 2 is a block diagram schematically showing an image processing unit and related elements of the image forming apparatus shown in FIG. 1.

FIG. 2 is a block diagram schematically showing the image processing unit and related elements of the image forming apparatus 10 shown in FIG. 1. The image foiling apparatus 10 has an image processing unit 50 that processes an image read by the reader (not shown) in addition to a CPU 51. A timer 55 is controlled by the CPU 51 and used for various time management. The CPU 51 integrally controls sections of the image forming apparatus according to a control program stored in a ROM 52 while using a RAM 53 as a work memory. The reader is provided with a CCD sensor 501 that converts an image of a read original into an electrical signal. This CCD sensor 501 is a color sensor with three lines of RGB. Image signals of R (Red), G (Green), and B (Blue) components that were output from the CCD sensor 501 are input into an A/D convertor 502 of the image processing unit 50.

The A/D convertor 502 converts the image signal of each color into 8-bit digital image data after performing gain adjustment and offset adjustment. The digital image data output from the A/D convertor 502 is input into a shading correction module 503. The shading correction module 503 corrects sensitivity dispersion between pixels of the CCD sensor 501, dispersion in the light amount of a document illumination lamp, etc. for every color while using signals obtained by reading a standard white plate. An input gamma correction module 504 corrects each of the RGB signals that were input from the shading correction module 503 while using a one-dimensional look-up table (LUT) so that luminance has a linear relation with the signal. An input direct mapping module 505 converts the RGB signals that were input from the input gamma correction module 504 into in-device RGB signals while using a three-dimensional LUT in order to unify a color space. The three-dimensional LUT can be used to convert a reading color space dependent on spectral characteristics of RGB filters of the CCD sensor 501 into a standard color space like an sRGB color space so as to absorb various characteristics, such as the sensitivity characteristics of the CCD sensor 501 and the spectral characteristics of the illumination lamp.

The data output from the input direct mapping module 505 is input into a sampling module 506. The sampling module 506 discretely samples pixels within a designated rectangular area measure and generates a histogram of luminance in order to measure a ground of an original. This histogram is used for ground elimination at a time of printing. A background elimination module 507 nonlinearly converts the RGB image data to eliminate measured values of the ground of the original on the basis of the result of the sampling module 506. An output direct mapping module 508 converts the RGB image data input from the background elimination module 507 into CMYK image data. In this conversion, the output direct mapping module 508 generates four-dimensional data of C (Cyan), M (Magenta), Y (Yellow), and K (Black) from the RGB three-dimensional data using a look-up table. An output gamma correction module 509 corrects density values of the CMYK image data input from the output direct mapping module 508 so as to obtain a proper output image according to the printer. The output gamma correction module 509 has a role of keeping linearity of input-and-output image data that is different for every image forming process on the basis of a one-dimensional LUT (hereinafter referred to as a γLUT) of CMYK stored beforehand. This γLUT of CMYK is updated at a timing at which a newly generated γLUT was sent to the output gamma correction module 509.

A halftone processing unit 510 is able to select an image forming process from among different types of image forming processes (screening) and to apply the selected process to the image data input from the output gamma correction module 509. Generally, an image forming process of an error diffusion system that hardly causes moire is used for a copy operation, and an image forming process of a multiple-value screen system using a dither matrix etc. is used for a print operation in consideration of a gradation, stability, and reproducibility of a character or a thin line. The former is a correcting method that weights a target pixel and its peripheral pixels with an error filter by distributing the errors in the multi-valuing while keeping the number of gradations. On the other hand, the latter is a method that sets up multiple thresholds of the dither matrix to express half gradations artificially. In the first embodiment, the components of CMYK are independently converted, and the low number of lines (rough lines) and the high number of lines (fine lines) are switchable.

Figure 3:
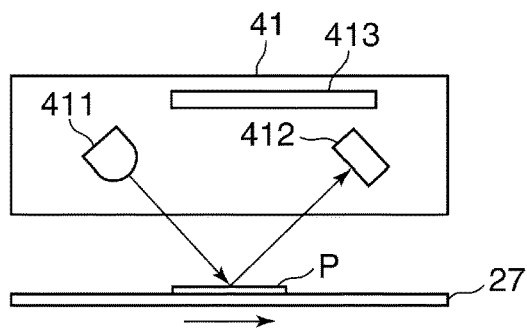
FIG. 3 is a schematic view showing a configuration of a pattern sensor in the image forming apparatus shown in FIG. 1.

FIG. 3 is a schematic view showing a configuration of the pattern sensor 41 in the image forming apparatus shown in FIG. 1. The pattern sensor 41 is a specular reflection type, and has a light source (light emission unit) 411 and a light receiver 412. The light source 411 is an LED, for example, and the light receiver 412 is a photodiode, for example. Furthermore, the pattern sensor 41 has an IC 413 that controls an emission light amount (light intensity) of the light source 411 as one of irradiation conditions (measurement conditions). The light source 411 is installed at an angle of 45 degrees to the normal line of the intermediate transfer belt 27, and irradiates the intermediate transfer belt 27. The light receiver 412 is installed at a position that is symmetrical to the light source 411 about the normal line of the intermediate transfer belt 27. The light receiver 412 receives the specular reflection light from the intermediate transfer belt 27 or a toner image in an irradiated area and outputs a value corresponding to the light receiving result (reflected light intensity, reflected light amount). FIG. 3 shows a case where the pattern image P1 passes through a measurement area of the pattern sensor 41. It should be noted that a detectable range of 0.0 [V] through 5.0 [V] is an output voltage range of the light receiver 412.

Incidentally, a density correction control (calibration) is achieved by controlling image forming conditions. Generally, the density correction control is divided roughly into two kinds including Dmax control that adjusts development contrast by changing electrifying bias, development bias, laser exposure intensity, etc. and gradation correction control that corrects input image data using an LUT. Although the gradation correction control is described as an example of the density correction control in the first embodiment, the present invention is not limited to this. The CPU 51 generates the γLUT on the basis of the measurement result of the pattern image P1 by the pattern sensor 41 in order to obtain an ideal gradation characteristic of the image forming apparatus. The γLUT applied to the output gamma correction module 509 is equivalent to one of the image forming conditions for the printer 10 to form an image.

Figure 4:
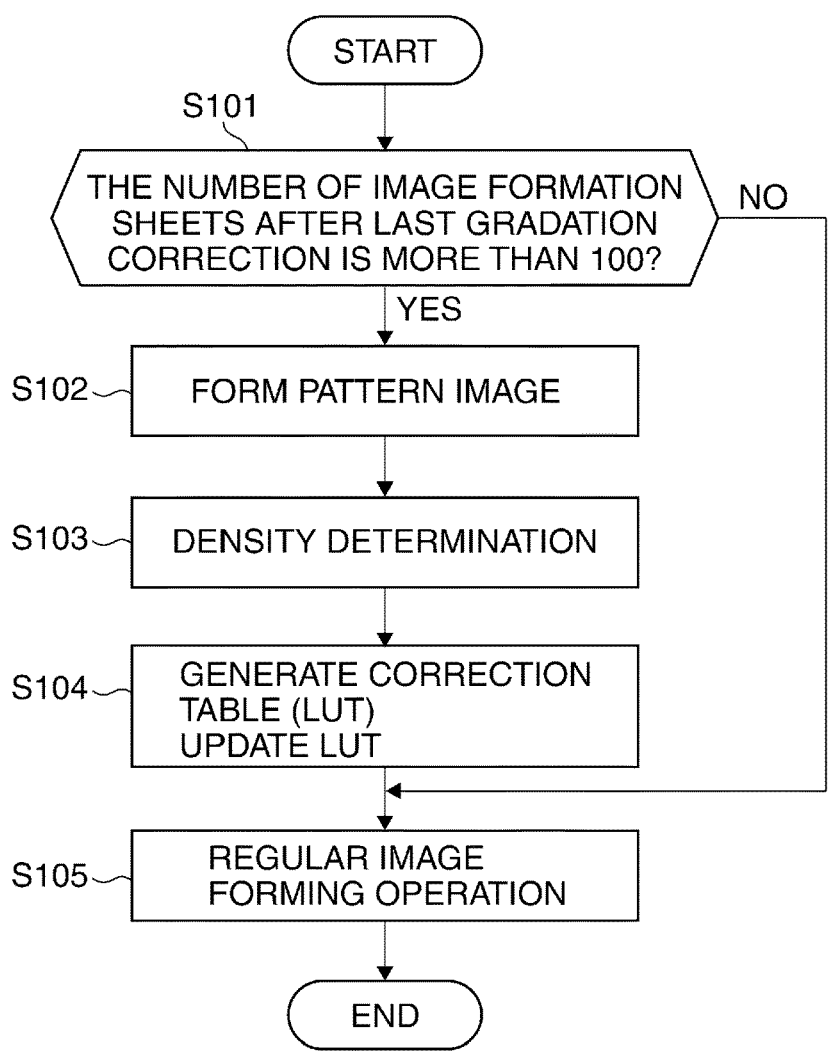
FIG. 4 is a flowchart showing a process of gradation correction control executed by the image forming apparatus shown in FIG. 1.

FIG. 4 is a flowchart showing a process of the gradation correction control. The process of this flowchart is achieved when a program stored in the ROM 51 is developed to the RAM 53 and the CPU 51 runs the program.

First, the CPU 51 determines whether the number of sheets (the number of image formation sheets) on which images were formed by the image forming apparatus after the last gradation correction control is 100 or more in step S101. It should be noted that the number of image formation sheets is always counted with a counter. When the number of image formation sheets is less than 100, the CPU 51 continues a regular image forming operation (step S105) and finishes the process in FIG. 4. When the number of image formation sheets is 100 or more, the process proceeds to step S102. It should be noted that the determination process in the step S101 is not limited to the above-mentioned example. For example, the CPU 51 may execute the gradation correction control in a case where a consumption amount of developer including toner exceeds a predetermined amount. Moreover, for example, the CPU 51 may execute the gradation correction control in a case where an environment condition that is detected by an environment sensor provided in the image forming apparatus is a predetermined condition. Moreover, for example, the CPU 51 may execute the gradation correction control in a case where operating time of the image forming apparatus after the last gradation correction control exceeds predetermined time. Moreover, for example, the CPU 51 may execute the gradation correction control in response to a user's instruction from an input device (not shown).

Figure 5:
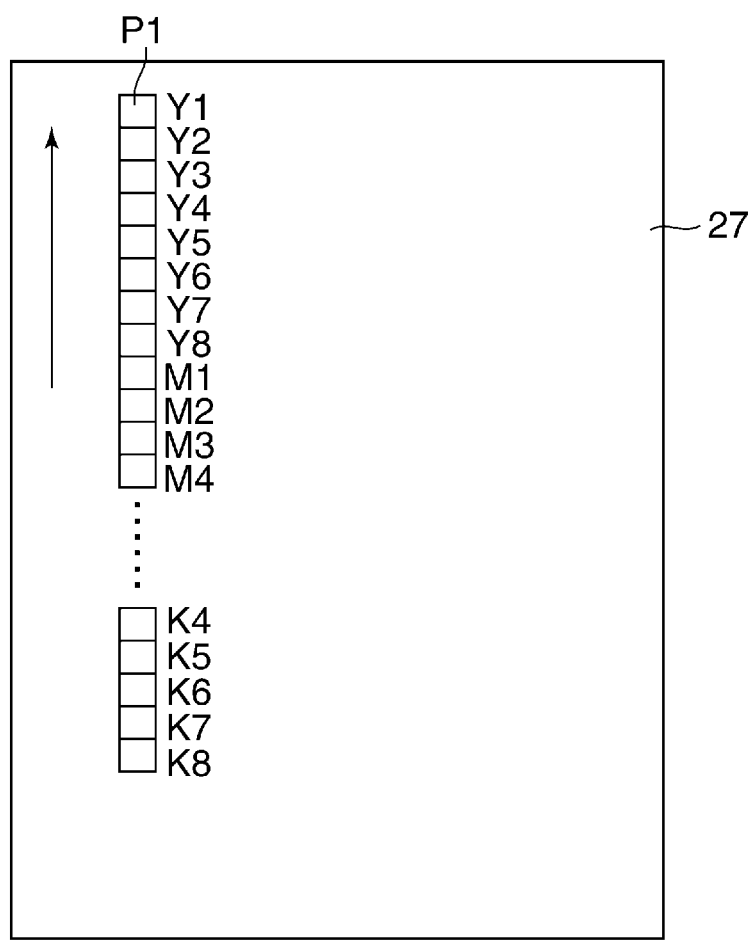
FIG. 5 is a view showing an example of a pattern image formed on an intermediate transfer belt of the image forming apparatus shown in FIG. 1.

In step S102, the CPU 51 controls the printer 10 to form the pattern image P1 (FIG. 5) on the intermediate transfer belt 27. In step S103, the CPU 51 measures the pattern image P1 with the pattern sensor 41, determines the density of the pattern image P1 on the basis of the measurement result, and obtains density data. A method for determining the density of the pattern image P1 will be described in detail below. In step S104, the CPU 51 generates the γLUT for correcting input image data on the basis of the obtained density data. Then, the γLUT in the output gamma correction module 509 is updated to the newly created γLUT. The method for generating the γLUT will be mentioned later. After that, input image data is corrected with the updated γLUT and an image is formed according to the corrected image data in the regular image formation in the step S105, FIG. 5 is a view showing an example of the pattern image P1. The pattern image P1 is formed on the intermediate transfer belt 27 in the first embodiment. The pattern image P1 is a group of measurement images each of which is a square with a one-side of 25 mm. It should be noted that the pattern image P1 is enough to be formed on an image bearing member, and may be formed on the photosensitive drum 22Y, 22M, 22C, or 22K. For example, when the pattern sensor 41 measures a pattern image formed on the photosensitive drum 22Y, for example, the pattern sensor 41 is enough to be arranged opposite to the photosensitive drum 22Y on which measurement images are formed.

An arrow in FIG. 5 indicates a rotational direction of the intermediate transfer belt 27. Eight measurement images are formed for each of Y, M, C, and K in the pattern image P1 while changing an image printing rate (a density gradation) in eight steps. The thirty-two measurement images in total are arranged in the rotational direction (circumferential direction) of the intermediate transfer belt 27. It should be noted that the irradiation light amount by the light source 411 varies depending on the measurement images of the pattern image P1 in the first embodiment. That is, the irradiation light amount is predetermined corresponding to the gradation of each of the measurement images of the pattern image P1. The printing rates (gradations) of the measurement images in the pattern image P1 and the corresponding irradiation light amounts are set up as follows.

Y1, M1, C1, K1: Printing rate 12.5%, Light amount L1
Y2, M2, C2, K2: Printing rate 25.0%, Light amount L1
Y3, M3, C3, K3: Printing rate 37.5%, Light amount L2
Y4, M4, C4, K4: Printing rate 50.0%, Light amount L2
Y5, M5, C5, K5: Printing rate 62.5%, Light amount L2
Y6, M6, C6, K6: Printing rate 75.0%, Light amount L2
Y7, M7, C7, K7: Printing rate 87.5%, Light amount L2
Y8, M8, C8, K8: Printing rate 100.0%, Light amount L2

The density determination of the pattern image P1 in the step S103 in FIG. 4 will be further described with reference to FIG. 6A, FIG. 6B, and FIG. 7. The density of the pattern image P1 is determined on the basis of the light receiving result of the reflected light from the pattern sensor 41. That is, the density is determined on the basis of the reflected light output corresponding to the light receiving result of the reflected light from the pattern image P1 in an area of the intermediate transfer belt 27 and the reflected light output corresponding to the light receiving result of the reflected light from the intermediate transfer belt 27 in the same area in which the toner is not attached.

The irradiation light amount is limited up to a value at which the reflected light amount falls within the detectable range of the sensor in a case where the pattern image P1 and the intermediate transfer belt 27 are measured with the same irradiation light amount irrespective of the density (gradation) of the pattern image P1. That is, the irradiation light amount is determined on the basis of the measured value (reflected light output) of the intermediate transfer belt 27 where the reflected light output is maximized. Against this, a profile (surface data) of the intermediate transfer belt 27 that is used for a reflected light output correction process is found by calculation instead of measurement in a case where the irradiation light amount is L2 that makes the measured value of the intermediate transfer belt 27 be outside the detectable range of the sensor in the first embodiment. Low-density measurement images of the pattern image P1 that largely change the sensor output with respect to the density variation are measured with the low irradiation light amount L1 (a first measurement condition). High-density measurement images are measured with the high irradiation light amount L2 (a second measurement condition).

Figure 6A:
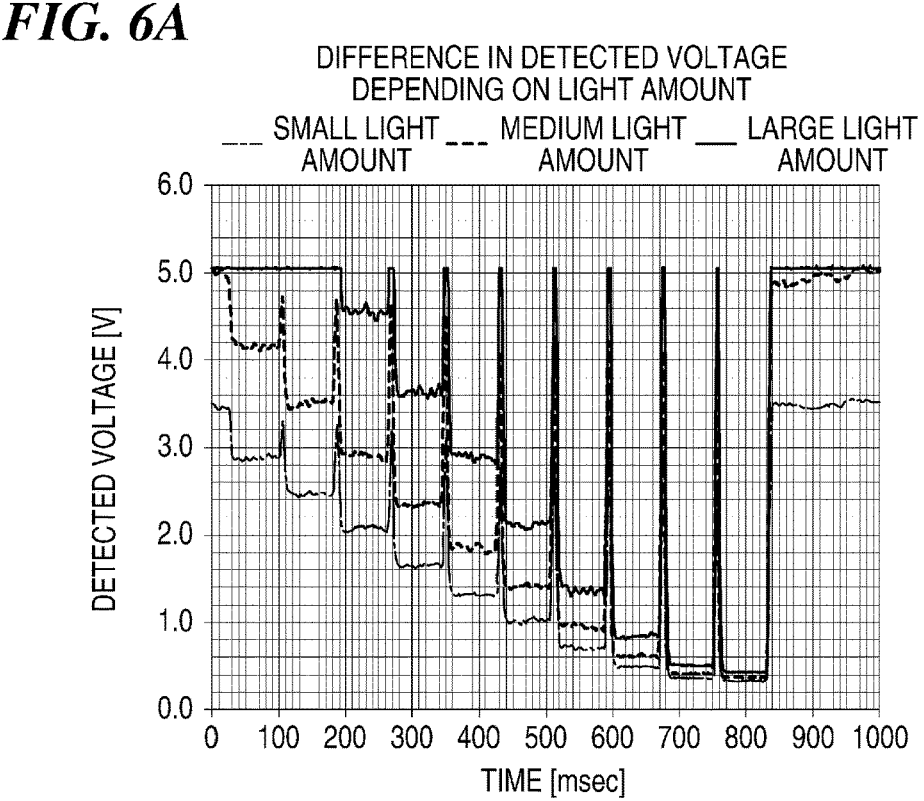
FIG. 6A is a graph showing measurement results of the pattern image in FIG. 5.
Figure 6B:
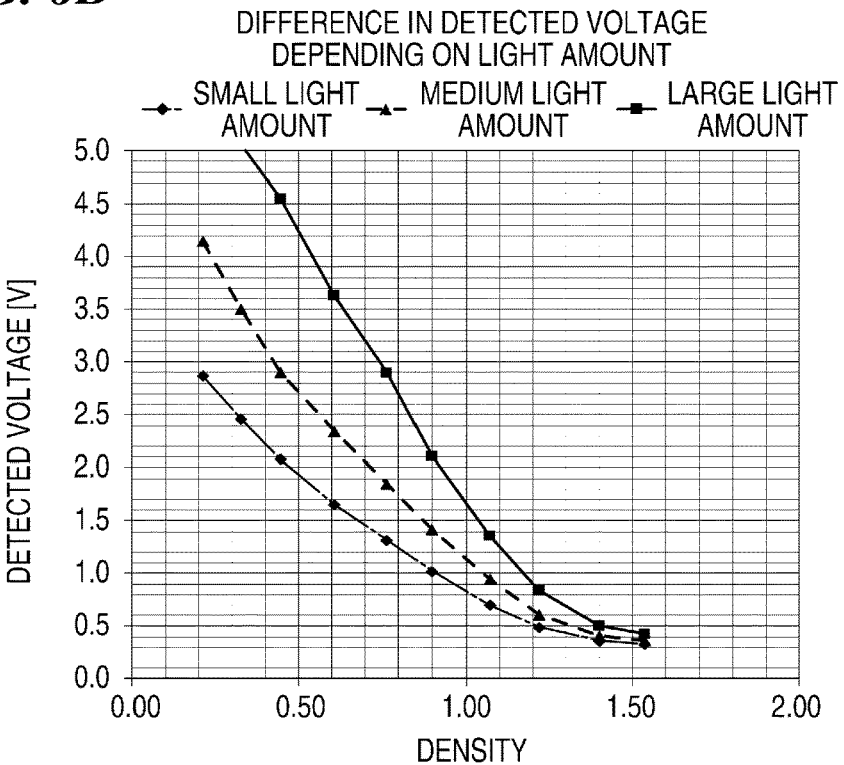
FIG. 6B is a graph showing relations between density values of the pattern image in FIG. 5 and detected voltages.

FIG. 6A is a graph showing results of measuring the pattern image P1 with three different irradiation light amounts (small, medium, and large). A horizontal axis denotes time and a vertical axis denotes detected voltage. FIG. 6B is a graph showing relations between the density value of the pattern image P1 and the detected voltage for every irradiation light amounts. A horizontal axis denotes the density value of the pattern image P1 and a vertical axis denotes the detected voltage. FIG. 6B shows that the inclination of the detected voltage with respect to the density value of the pattern image becomes larger as the irradiation light amount becomes higher. The larger the inclination is, the smaller the error of the value that is obtained by converting the detected voltage into the density of the pattern image P1. Accordingly, the larger inclination means higher measurement accuracy. In the first embodiment, the irradiation light amount at the time of measurement is changed corresponding to a gradation range (density range) of the pattern image P1. The irradiation light amount is controlled by adjusting the voltage applied to the light source 411 in the pattern sensor 41 by the IC 413.

Figure 7:
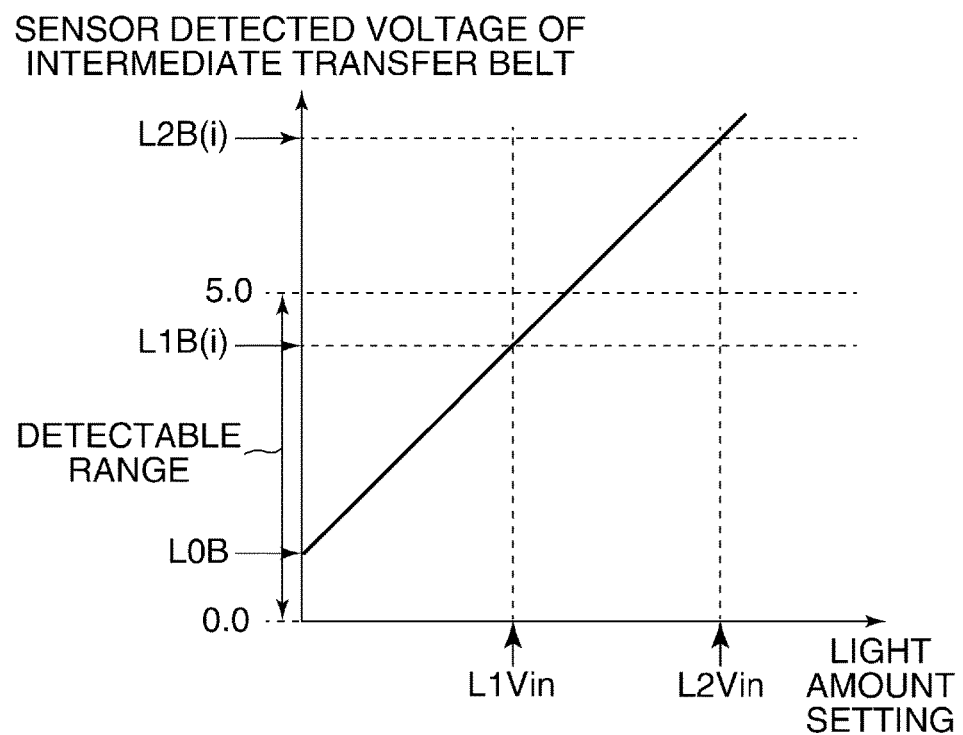
FIG. 7 is a graph showing a relation between the sensor detection voltage output in a case where the intermediate transfer belt is measured and a light amount setting in the image forming apparatus shown in FIG. 1.

FIG. 7 is a graph showing a relation between the sensor detection voltage (reflected light output) output in a case where the intermediate transfer belt 27 is measured and a light amount setting. Generally, an emission light amount of a light emission element, such as LED, increases linearly as input voltage to the light source 411 increases. A dark current voltage L0B is a detection output in a case where the input voltage to the light source 411 is set to 0. The dark current voltage L0B is mainly determined by sensor characteristics. As mentioned above, the light receiver 412 involves the detectable range of 0.0 [V] through 5.0 [V].

In the first embodiment, the lower irradiation light amount L1 is determined so that the reflected light output of the intermediate transfer belt 27 falls within the detectable range of the light receiver 412. Specifically, the irradiation light amount L1 is determined so that the reflected light output of the intermediate transfer belt 27 becomes 4.0 [V]±0.1 [V], and the input voltage to the light source 411 for achieving the irradiation light amount L1 is denoted as L1Vin. The higher irradiation light amount L2 is determined so that the reflected light output of the intermediate transfer belt 27 becomes outside the detectable range of the light receiver 412 (the output is saturated and sticks to 5.0 [V]), and the input voltage to the light source 411 for achieving the irradiation light amount L2 is denoted as L2Vin. The input voltage L2Vin shall be a fixed value. It may be found by adjusting depending on a condition, or may be found by multiplying the input voltage L1Vin by predetermined times.

In the above description, it is presupposed that the irradiation light amount L1 is set to the measurement image Y2 of which the gradation is 25% and the irradiation light amount L2 is set to the measurement image Y3 of which the gradation is 37.5%. Even when a threshold of the gradation differs from the above example, the irradiation light amount L1 or L2 is selected. The threshold of the gradation that divides the irradiation light amount to be selected shall be in a range of 25% through 37.5%. Accordingly, the irradiation light amount L1 is set to measurement images of gradations (first gradation range) below the threshold, and the irradiation light amount L2 is set to measurement images of gradations (second gradation range) beyond the threshold. The threshold (for example, 31%) of the gradation is equal to or more than a gradation (for example, 30%) in which the output of the pattern sensor 41 is saturated while using the irradiation light amount L2. Accordingly, the first gradation range includes a gradation in which the output of the pattern sensor 41 is saturated while using the irradiation light amount L2.

Next, measurement of a profile using each of the irradiation light amounts will be described with reference to FIG. 8A, FIG. 8B, and FIG. 8C. The CPU 51 obtains a first profile that is a reflected light output corresponding to a light receiving result of reflected light from the intermediate transfer belt 27 that is irradiated with the irradiation light amount L1. That is, the first profile used in the reflected light output correction process for the density determination of measurement images (first measurement image group) in the first gradation range of the pattern image P1 is obtained by actual measurement. On the other hand, the second profile used in the reflected light output correction process for the density determination of measurement images (second measurement image group) in the second gradation range of the pattern image P1 is determined and obtained by calculation on the basis of the first profile and the irradiation light amounts L1 and L2.

A reflected light output L1B(i) in FIG. 7 is an output of the sensor 41 in a case where the intermediate transfer belt 27 is irradiated with the irradiation light amount L1. The first profile is a profile of the reflected light output L1B(i) for one round of the intermediate transfer belt 27. A reflected light output L2B(i) in FIG. 7 is an output of the pattern sensor 41 in a case where the intermediate transfer belt 27 is irradiated with the irradiation light amount L2. The reflected light output L2B(i) is an estimated value, which is not an actual measured value, because the output becomes outside the detectable range of the light receiver 412 (more than 5.0 [V] at which the output is saturated). The second profile is a profile of the reflected light output L2B(i) for one round of the intermediate transfer belt 27.

Figures 8A, 8B, 8C:
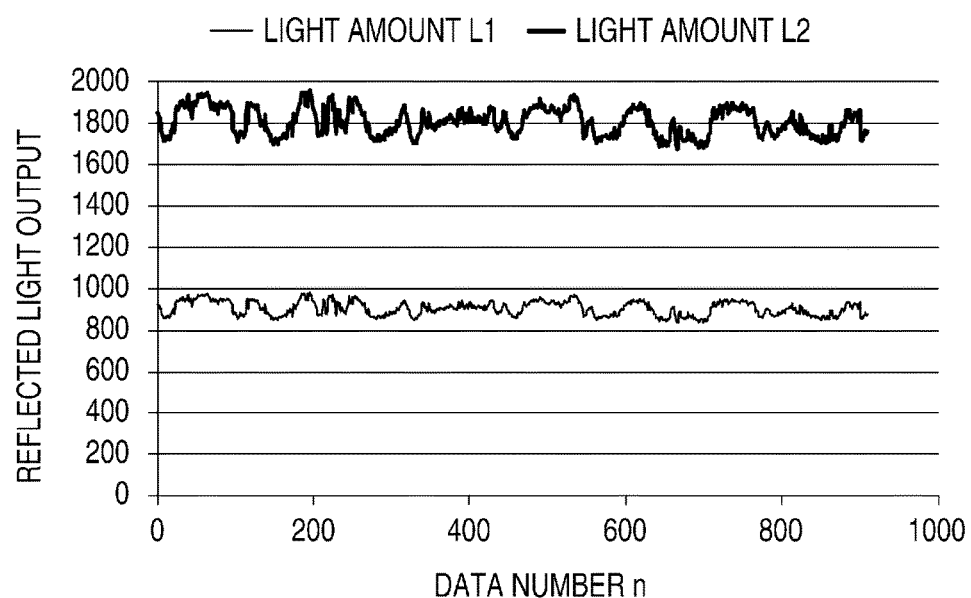
FIG. 8A and FIG. 8B are tables showing one-round profiles of the intermediate transfer belt that are shown by reflected light outputs in the image forming apparatus shown in FIG. 1.
FIG. 8C is a graph showing relations between measuring positions and reflected light outputs in the one-round profiles.

FIG. 8A and FIG. 8B are views respectively showing tables of the profiles of the reflected light outputs L1B(i) and L2B(i) for one round of intermediate transfer belt 27. It should be noted that the reflected light outputs in FIG. 8A, FIG. 8B, and FIG. 8C are obtained by converting the analog output voltages into digital values with an A/D converter (not shown). The profiles for one round of the intermediate transfer belt are stored in the RAM 53 (FIG. 2). Each of the profiles consists of the reflected light outputs that are read by the pattern sensor 41 at measuring positions denoted by data numbers n for one round of the intermediate transfer belt 27. The data number n=0 corresponds to a position measured by the pattern sensor 41 at an HP detection timing at which the HP mark 43 is detected.

FIG. 8C is a view showing a relation between the measuring position and the reflected light output in each of the profiles. A horizontal axis denotes the measuring position (data number n), and a vertical axis denotes the reflected light output of the pattern sensor 41.

When a measuring operation for one round of the intermediate transfer belts is performed to obtain a profile, the intermediate transfer belt 27 rotates without toner. In this state, the pattern sensor 41 reads one round of the rotating intermediate transfer belt 27. The CPU 51 stores specular reflection light outputs (sensor outputs) obtained by reading into the RAM 53 as a profile of the intermediate transfer belt 27 for one round (hereinafter referred to as a one-round profile). Rotational speed of the intermediate transfer belt 27 is 246 mm/sec, and a perimeter thereof is 895 mm, and a measurement time interval of the pattern sensor 41 is 4 msec (the measurement count is 250 times/sec) in the first embodiment. Accordingly, 910 pieces of data values are obtained from the outputs of the pattern sensor 41 as shown by the following formula (1).

$$(895/246) \cdot 250 \approx 910 \quad (1)$$

As shown in FIG. 8A and FIG. 8B, the one-round profile with each of the irradiation light amounts L1 and L2 consists of 910 pieces of continuous data values. The formation position of the pattern image P1 on the intermediate transfer belt 27 is calculated as the data number n according to elapsed time from the HP detection timing mentioned above. The data number n is calculated on the basis of the elapsed time T (sec) from the HP detection timing according to the following formula (2).

$$n = T \cdot 250 \quad (2)$$

The CPU 51 always manages a phase of the intermediate transfer belt 27 during operations of the apparatus, and specifies a position opposed to the pattern sensor 41. The CPU 51 manages the phase (i) of the intermediate transfer belt using the position of the HP mark as a standard (0).

Figure 9:
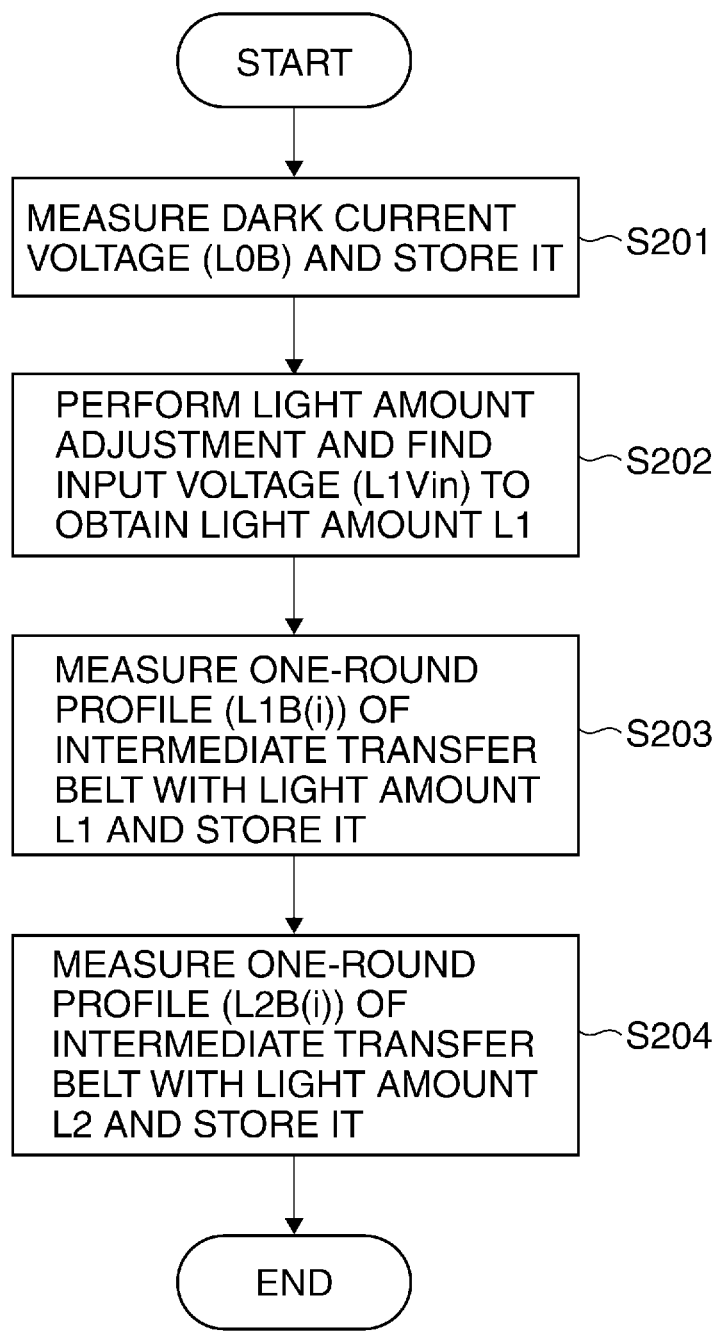
FIG. 9 is a flowchart showing a one-round profile obtaining process executed by the image forming apparatus shown in FIG. 1.

Next, a method for obtaining the first profile (the one-round profile of the reflected light output L1B(i)) and the second profile (the one-round profile of the reflected light output L2B(i)) will be described with reference to FIG. 9. FIG. 9 is a flowchart showing a one-round profile obtaining process. The process of this flowchart is achieved when a program stored in the ROM 51 is developed to the RAM 53 and the CPU 51 runs the program. This process starts in response to a user's instruction, for example, or may be performed periodically. It should be noted that the first and second profiles are stored in the RAM 53 and are updated to the newest one after completing the one-round profile obtaining process in FIG. 9.

In step S201, the CPU 51 measures the dark current voltage L0B while setting the input voltage to the light source 411 to 0, and stores the measured result into the RAM 53. Since the dark current voltage L0B is taken into consideration to calculation of the second profile, management of the phase is unnecessary. In a case where the dark current voltage L0B is enough smaller than the sensor output in the irradiation light amount L1, the dark current voltage L0B may be disregarded. In step S202, the CPU 51 finds the input voltage L1Vin at which the emission light amount of the light source 411 becomes the irradiation light amount L1 by adjusting the voltage applied to the light source 411 in the pattern sensor 41 with the IC 413, and stores the input voltage into the RAM 53. In step S203, the CPU 51 obtains the first profile (one-round profile of the reflected light output L1B(i)) by the method of the actual measurement mentioned above, and stores the first profile into the RAM 53. In step S204, the CPU 51 obtains the second profile by calculation by calculating the reflected light output L2B(i) according to the following formula (3), and stores the second profile into the RAM 53.

$$L2B(i) = \{(L1B(i) - L0B)/L1Vin\} \cdot L2Vin + L0B \quad (3)$$

The formula (3) enables the calculation of the second profile under the condition where the effect of the dark current voltage L0B is eliminated. Then, the process in FIG. 9 finishes. Accordingly, the second profile is calculated by multiplying a ratio of the value corresponding to the irradiation light amount L2 to the value corresponding to the irradiation light amount L1 to the first profile (surface data) while taking the dark current voltage L0B into consideration.

Next, the reflected light output correction process will be described. In the reflected light output correction process, the CPU 51 corrects the effect of the reflected light from the intermediate transfer belt 27 in the specular reflection output of the pattern image P1 by dividing the reflected light output of the pattern image P1 by the reflected light output of the intermediate transfer belt 27 for every irradiation light amount. In that case, the CPU 51 calculates so that the effect of the dark current voltage L0B is removed.

Specifically, the reflected light output of the pattern image P1 by the pattern sensor 41 with the irradiation light amount L1 shall be denoted by L1P(i) (a second output signal). In the density determination with the irradiation light amount L1, the CPU 51 calculates a correction output SIG(i) of the pattern image P1 according to the following formula (4).

$$SIG(i) = (L1P(i) - L0B)/(L1B(i) - L0B) \quad (4)$$

On the other hand, the reflected light output of the pattern image P1 by the pattern sensor 41 with the irradiation light amount L2 shall be denoted by L2P(i). In the density determination with the irradiation light amount L2, the CPU 51 calculates a correction output SIG(i) of the pattern image P1 according to the following formula (5).

$$SIG(i) = (L2P(i) - L0B)/(L2B(i) - L0B) \quad (5)$$

Figure 10:
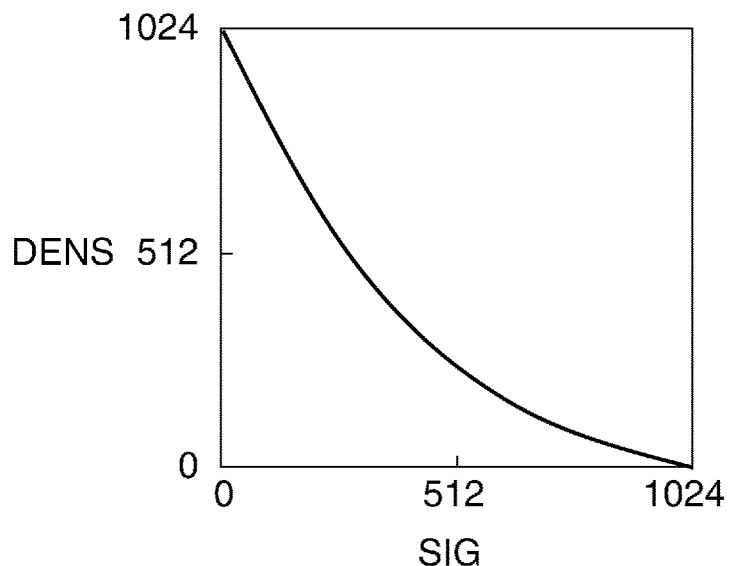
FIG. 10 is a graph showing of a relation defined in a density conversion table in the image forming apparatus shown in FIG. 1.

Subsequently, the CPU 51 converts the correction output SIG(i) into a density value DENS(i) of the pattern image P1 using a density conversion table shown in FIG. 10. The density conversion table is beforehand stored in the ROM 52, and is generated in accordance with output characteristics of the pattern sensor 41. It should be noted that the density conversion table may be generated and held for each of the irradiation light amounts. In the first embodiment, the pattern sensor 41 measures a measurement image of the same density of the pattern image P1 (formed in the same gradation) multiple times (for example, 10 times). Then, the average of the ten density values that are converted on the basis of the density conversion table is found as the density value DENS(i) of the measurement image concerned.

Thus, the CPU 51 determines the density value DENS(i) of the pattern image P1 on the basis of the reflected light output (reflected light amount) of the pattern image P1 and the reflected light output (reflected light amount) of the intermediate transfer belt 27. Since the density value DENS(i) of the pattern image P1 is the density value obtained in consideration of the unevenness of the surface state of the intermediate transfer belt 27, the density is determined with high accuracy by the reflected light output correction process. Furthermore, correction data is generated on the basis of the calculated result. Details of the process will be described later with reference to FIG. 11. Then, the CPU 51 sends the generated correction data to the image processing unit 50.

Next, a concrete example of the gradation correction control in FIG. 4 will be described. The gradation correction control is performed along the following procedures (a1) through (d2).

Procedure (a1): When the gradation correction control is performed, the CPU 51 makes the pattern image P1 form on the intermediate transfer belt 27. This is equivalent to the step S102 in FIG. 4. Then, the CPU 51 measures the pattern image P1 with the pattern sensor 41 in a state where the pattern sensor 41 is controlled so as to switch the irradiation light amounts L1 and L2 mentioned above. That is, the CPU 51 measures the measurement images Y1 and Y2 in the first gradation range (the gradation is 25% or less in the example) using the irradiation light amount L1, and measures the measurement images Y3 through Y8 in the second gradation range (the gradation is 37.5% or more in the example) using the irradiation light amount L2.

Procedure (b1): The CPU 51 specifies the reflected light output of the position on the intermediate transfer belt 27 corresponding to the formation position of the pattern image P1 on the basis of the irradiation light amount at the time of measuring the pattern image and the formation position of the pattern image P1. In this time, the CPU 51 specifies the reflected light output of the position on the intermediate transfer belt 27 corresponding to each of the formation positions from the first (second) profile when the irradiation light amount is L1 (L2).

Procedure (c1): The CPU 51 determines the density of the pattern image P1 using the reflected light output of the pattern image P1 and the reflected light output of the intermediate transfer belt 27. Specifically, the CPU 51 calculates (determines) the density value DENS(i) about the measurement images of the pattern image P1 in the first gradation range on the basis of the value obtained from the first profile and the reflected light output of the pattern image P1 in the case where the irradiation light amount L1 is used. Moreover, the CPU 51 calculates (determines) the density DENS(i) about the measurement images of the pattern image P1 in the second gradation range on the basis of the value obtained from the second profile and the reflected light output of the pattern image P1 in the case where the irradiation light amount L2 is used. The process from the latter half of the procedure (a1) to the procedure (c1) is equivalent to the step S103 in FIG. 4.

Procedure (d1): The CPU 51 performs the gradation correction control on the basis of the calculated density value of the pattern image P1.

The gradation correction control of the procedure (d1) is equivalent to the step S104 in FIG. 4. First, the CPU 51 generates the correction data on the basis of the calculated density value of the pattern image P1, and the output gamma correction module 509 corrects the input image data using the correction data (γLUT). Next, the γLUT that is updated by the measurement result of the density of the pattern image P1 will be described with reference to FIG. 11.

Figure 11:
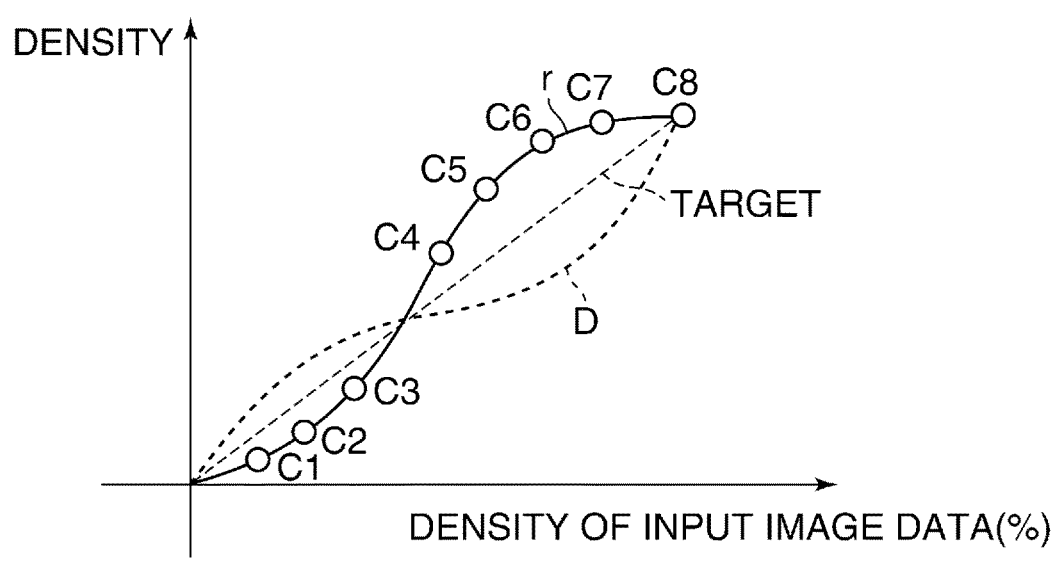
FIG. 11 is a graph showing an example of a γLUT in the image forming apparatus shown in FIG. 1.

FIG. 11 is a graph showing an example of the γLUT stored in the RAM 53. Although only the gradation correction process for a cyan image will be described, magenta, yellow, and black images will be corrected by the similar method. The γLUT is correction data for correcting the input image data so that the density of the input image data linearly relates to the density of the output image. A horizontal axis denotes input image data, and a vertical axis denotes the measured density value (determined density value DENS(i)) of the pattern image P1 that is measured with the pattern sensor 41.

Moreover, a linear target gradation characteristic TARGET indicates a gradation characteristic as a target of the image density control. The points C1 through C8 indicate the measured density values of the cyan measurement images of the pattern image P1. A curve r connects the measured density values of the pattern image P1. In the description, the curve r indicates a gradation characteristic before performing the image density control. It should be noted that density values of gradations that are not included in the pattern image on the curve r are calculated by performing spline interpolation so that the curve r connects an origin and the points C1 through C8. A curve D indicates the γLUT calculated by the image density control. The curve D is calculated by finding symmetrical points to the target gradation characteristic TARGET of the curve r before the correction. When the measured density value is corrected on the basis of the curve D (when the value on the curve D is multiplied to the density value of the input image, for example), the gradation characteristic of the density value of the output image to the density value of the inputted image approaches to the target gradation characteristic TARGET.

When the γLUT (curve D) calculated (generated) is stored into the RAM 53, it is updated by being replaced with the γLUT generated beforehand. After that, the image forming apparatus obtains an image of the target density by correcting the input image data using the updated γLUT and by forming the image according to the corrected image data.

FIG. 12A is a view showing the measurement accuracies in a case where measurement images of various gradations are measured with the low irradiation light amount L1 in comparison with the measurement accuracies in a case where the measurement images are measured with the high irradiation light amount L2. In this example, the irradiation light amount L2 is twice the irradiation light amount L1.

FIG. 12B is a view showing the measurement accuracies of the measurement images of various gradations of the pattern image in the first embodiment in comparison with the measurement accuracies of the measurement images of various gradations of the pattern image with the low irradiation light amount L1. In the first embodiment, the measurement images of the low gradation of the pattern image are measured with the irradiation light amount L1, and the measurement images of the high gradation is measured by the irradiation light amount L2. Since the measurement images of the low gradation of the pattern image are measured with the irradiation light amount L1 in both the cases, there is no difference in the measurement accuracy. On the other hand, concerning the measurement images of the high gradation, the measurement accuracy in the first embodiment measured with the irradiation light amount L2 becomes about twice the case measured with the irradiation light amount L1.

As described above, since the measurement images of the high gradation of the pattern image are measured with the high irradiation light amount, variation of the sensor output in response to the variation of gradation of the pattern image becomes large, and an error at the time of converting the density becomes small. Moreover, effects of errors that do not depend on the light amount, such as electric noise of the light receiver, also become small relatively.

According to the first embodiment, the first profile (first surface data) is obtained by the actual measurement as the one-round profile that is used in the determination of the density. On the other hand, the second profile (second surface data) is obtained by calculation on the basis of the first profile and the irradiation light amounts L1 and L2. Then, the irradiation light amount used in the determination of the density is set up corresponding to the gradation of the pattern image. That is, the CPU 51 determines the density value DENS(i) about the measurement images of the pattern image P1 in the first gradation range on the basis of the first profile and the reflected light output of the pattern image P1 in the case where the irradiation light amount L1 is used. Moreover, the CPU 51 determines the density value DENS (i) about the measurement images of the pattern image P1 in the second gradation range on the basis of the second profile and the reflected light output of the pattern image P1 in the case where the irradiation light amount L2 is used. This enhances the density determination accuracy of the pattern image in a wide gradation range. Accordingly, the irradiation light amount is set up appropriately so as to enhance the measurement accuracy (density determination accuracy) of the pattern image, which improves the image quality of a printed image.

Moreover, the gradation range of the measurement images of the pattern image P1 that are measured with the irradiation light amount L1 (the first gradation range) includes the gradation in which the output of the pattern sensor 41 is saturated while using the irradiation light amount L2. This prevents saturation of the output in measurement of the measurement images of all the gradations of the pattern image P1.

Moreover, the second profile is calculated according to the formula (3) using the sensor output in a case where the irradiation light amount is 0 as a standard. Thereby, the second surface data is calculated correctly by eliminating an effect of the dark current voltage.

It should be noted that a period may be needed until an actual irradiation light amount is stabilized depending on a type and light amount setting of the pattern sensor 41. Accordingly, the CPU 51 may provide a predetermined time interval at time of switching the irradiation light amount in order to measure the pattern image P1 with the stable irradiation light amount. For the purpose, the measurement images may be spaced apart from each other in an area where the irradiation light amount is switched so as not to use an area in which the light amount is not stabilized, for example. That is, a predetermined space is given between the low-density measurement images and high-density measurement images of the pattern image P1, and a switching timing of the light amount is matched with the space. Alternatively, a predetermined time interval may be given by changing belt conveyance speed on the way while forming the measurement images of the pattern image P1 regularly. For example, the CPU 51 lowers the belt conveyance speed.

Although two stages of irradiation light amounts are set up for the determination of the density corresponding to the gradations of the pattern image, three or more stages may be set up.

Next, a second embodiment of the present invention will be described. As mentioned above, the density correction control is roughly divided into the Dmax control and the gradation correction control. The gradation correction control in the first embodiment particularly enhances the reading accuracy of the high-density measurement images by changing the irradiation light amount between the time of measurement of the low-density measurement images and the time of measurement of the high-density measurement images of the pattern image P1, Against this, the second embodiment of the present invention switches the irradiation light amount used at the time of measurement of the pattern image between control to determine a development contrast (the Dmax control) and the gradation correction control. The development contrast is electric potential difference between the exposure electric potential of an image bearing member and developing bias. The second embodiment will be described with reference to FIG. 13 through FIG. 16 in addition to the first embodiment.

Figure 13:
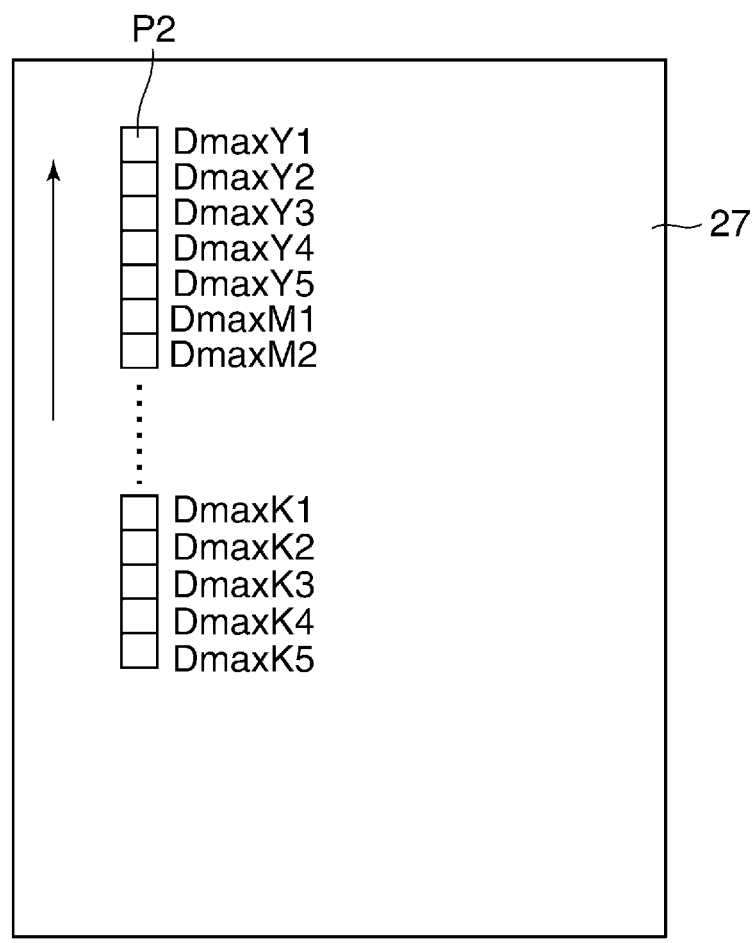
FIG. 13 is a view showing an example of a pattern image for development-contrast compensation in an image forming apparatus according to a second embodiment of the present invention.

FIG. 13 is a view showing an example of a pattern image P2 for development-contrast correction used in the Dmax control. The pattern image P2 is formed on the intermediate transfer belt 27 in the second embodiment. It should be noted that the pattern image P2 is enough to be formed on an image bearing member, and may be formed on the photosensitive drum 22Y, 22M, 22C, or 22K. For example, when the pattern sensor 41 measures a pattern image formed on the photosensitive drum 22Y, for example, the pattern sensor 41 is enough to be arranged opposite to the photosensitive drum 22Y on which measurement images are formed.

An arrow in FIG. 13 indicates the rotational direction of the intermediate transfer belt 27. The pattern image P2 is a group of measurement images each of which is a square with a one-side of 25 mm. Five measurement images are formed for each of Y, M, C, and K in the pattern image P2 while changing the development contrast in five steps of V1, V2, V3, V4, and V5 by changing charging bias, developing bias, a laser exposure intensity, etc. The pattern image P2 consists of the twenty measurement images in total that are formed in the rotative direction (circumferential direction) of the intermediate transfer belt 27. It should be noted that an image printing rate (density gradation) of all the measurement images of the pattern image P2 shall be identical.

Figure 14:
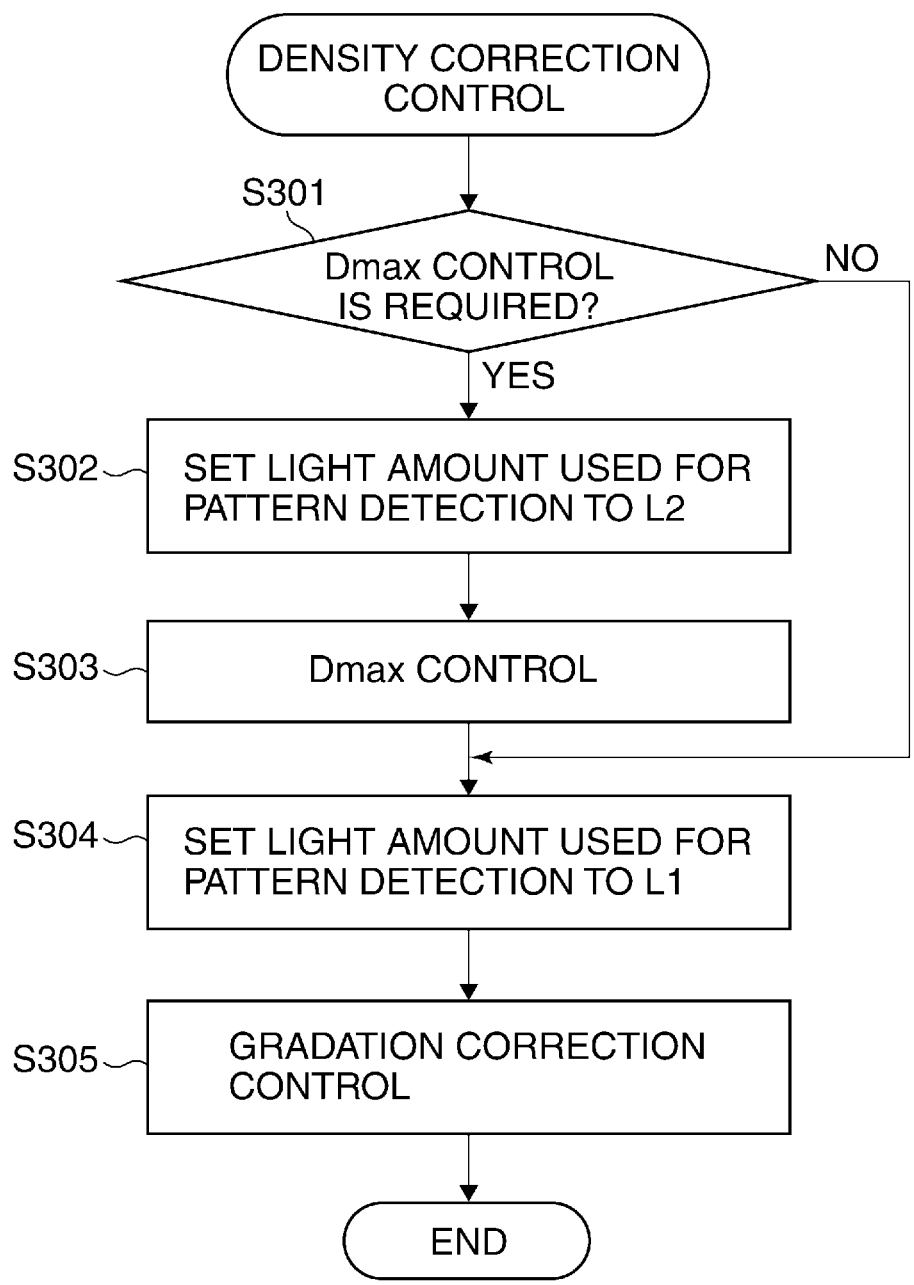
FIG. 14 is a flowchart showing a process of density correction control executed by the image forming apparatus according to the second embodiment.

FIG. 14 is a flowchart showing a process of density correction control executed by the image forming apparatus according to the second embodiment. The process of this flowchart is achieved when a program stored in the ROM 51 is developed to the RAM 53 and the CPU 51 runs the program.

It should be noted that the first profile (one-round profile of the reflected light output L1B(i)) and the second profile (one-round profile of reflected light output L2B(i)) are obtained also in the second embodiment as with the first embodiment (FIG. 9). Moreover, the meaning of the irradiation light amounts L1 and L2 are the same as that described in the first embodiment.

The CPU 51 determines whether the Dmax control is required in step S301. When a cumulative amount of image forming operations is more than a predetermined amount, or when a user designates an execution, for example, it is determined that the Dmax control is required. When the Dmax control is not required, the CPU 51 proceeds with the process to step S304. On the other hand, when the Dmax control is required, the process proceeds to step S302.

In the step S302, the CPU 51 sets the irradiation light amount that is used for the measurement of the pattern image P2 in the pattern sensor 41 to L2. Since the Dmax control is performed so that the maximum density in which the image printing rate is 100% becomes a target density, a high-density pattern image is used. It is appropriate that the high-density pattern image is measured with the high irradiation light amount L2 so as to enhance the measurement accuracy. Next, the CPU 51 performs the Dmax control in step S303. Details of the Dmax control will be mentioned later as procedures (a2) through (d2).

In the step S304, the CPU 51 sets the irradiation light amount to L1. This enables the measurement of the pattern image P1 that consists of the measurement images in the low-density range and high-density range by the gradation correction control performed thereafter. Next, the CPU 51 performs the gradation correction control in step S305. The gradation correction control is performed after the Dmax control in the step S303, because the execution of the Dmax control changes the gradation characteristic by the correction of the development contrast. In the gradation correction control, the measurement images of the pattern image P1 of all the gradations are measured with the same irradiation light amount L1. It should be noted that the irradiation light amount used for determining the density may be set according to the gradation of the pattern image P1 also in the gradation correction control as described in the first embodiment. Then, the process in FIG. 14 finishes.

Incidentally, the development contrasts of the measurement images in the pattern image P2 used for the Dmax control are set up as follows.
DmaxY1, DmaxM1, DmaxC1, DmaxK1:V1
DmaxY2, DmaxM2, DmaxC2, DmaxK2:V2
DmaxY3, DmaxM3, DmaxC3, DmaxK3:V3
DmaxY4, DmaxM4, DmaxC4, DmaxK4:V4
DmaxY5, DmaxM5, DmaxC5, DmaxK5:V5

Next, a concrete example of the Dmax control process in the step S303 will be described. The Dmax control process is performed along the following procedures (a2) through (d2).

Procedure (a2): When the Dmax control is performed, the CPU 51 forms the pattern image P2 on the intermediate transfer belt 27, and measures the pattern image P2 with the pattern sensor 41 while controlling the pattern sensor 41 with the irradiation light amount L2.

Procedure (b2): The CPU 51 specifies the reflected light output of the position on the intermediate transfer belt 27 corresponding to the formation position of the pattern image P2 on the basis of the irradiation light amount L2 at the time of measuring the pattern image and the formation position of the pattern image P2. In this time, the CPU 51 specifies the reflected light output of the position on the intermediate transfer belt 27 corresponding to each of the formation positions from the second profile.

Procedure (c2): The CPU 51 determines the density of the pattern image P2 using the reflected light output of the pattern image P2 and the reflected light output of the intermediate transfer belt 27. Specifically, the CPU 51 calculates (determines) the density value DENS(i) about the pattern image P2 on the basis of the value obtained from the second profile and the reflected light output of the pattern image P2 in the case where the irradiation light amount L2 is used.

Procedure (d2): The CPU 51 performs a development contrast control on the basis of the calculated density value of the pattern image P2.

Figures 15, 16:
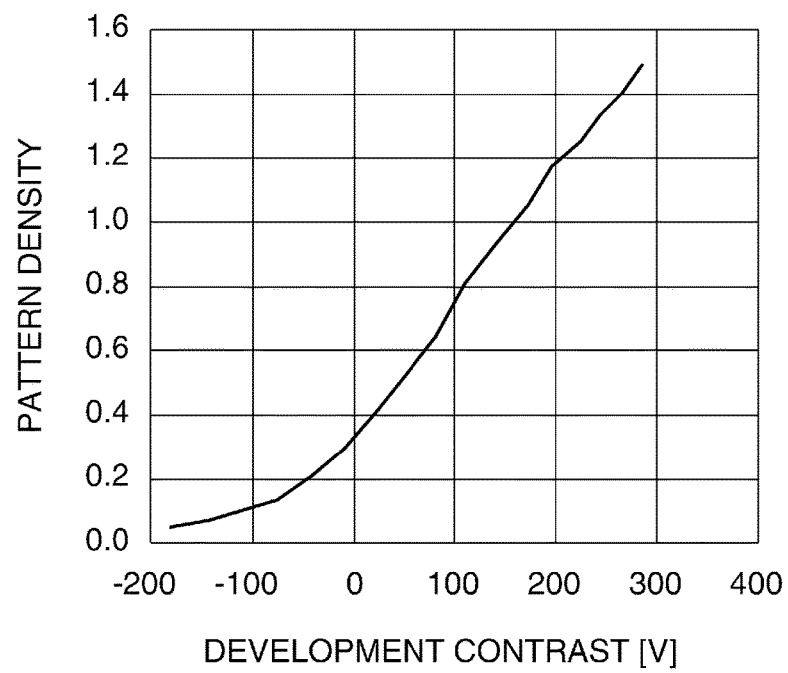
FIG. 15 is a graph showing a relation between the density value of the pattern image and the development contrast in the image forming apparatus according the second embodiment.
FIG. 16 is a view showing comparison of the measurement accuracies in cases where the pattern image of the same gradation is measured with the low and high irradiation light amounts.

The contrast control of the procedure (d2) is performed as follows. FIG. 15 is a graph showing a relation between the density value of the pattern image P2 and the development contrast. The relation is stored in the ROM 52. The CPU 51 determines the development contrast at which the image formation is performed on the basis of the density value of the pattern image P2. That is, the CPU 51 determines the development contrast so that the maximum density in which the image printing rate is 100% becomes a target density using the relation shown in FIG. 15. The determined development contrast is reflected to subsequent image formations.

FIG. 16 is a view showing comparison of the measurement accuracies in cases where the pattern image of the same gradation is measured with the irradiation light amounts L1 and L2. As compared with the measurement with the irradiation light amount L1, the accuracy of the measurement with the irradiation light amount L2 in the second embodiment is high.

According to the second embodiment, the CPU 51 differentiates the irradiation light amount between the case where the gradation is controlled and the case where the development contrast is controlled. When controlling the development contrast, the CPU 51 determines the density of the pattern image P2 for correcting the development contrast on the basis of the second profile and the reflected light output of the pattern image P2 in a case where the irradiation light amount L2 is used. This enhances the determination accuracy of the density of the pattern image for correcting the development contrast. Accordingly, the irradiation light amount is set up appropriately, which enhances the measurement accuracy of a pattern image and improves the quality of the printed image in the same manner as the first embodiment.

Next, a third embodiment of the present invention will be described. An image forming apparatus 100 according to the third embodiment uses the irradiation light amount L1 in a case where pattern images of chromatic colors (yellow, cyan, and magenta) are measured and uses the irradiation light amount L2 in a case where a black pattern image is measured. Since a reflected light amount from a black pattern image is less than that from a pattern image of a chromatic color, there is high probability that a sensor output of the black pattern image lowers. Since the image forming apparatus 100 according to the third embodiment uses the irradiation light amount L2 for measuring the black pattern image, degradation of the sensor output is reduced and the pattern image is detectable with high accuracy.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-024015, filed Feb. 13, 2017, which is hereby incorporated by reference herein in its entirety.

What is claimed is:
1. An image forming apparatus that forms an image on a sheet, the image forming apparatus comprising:
   an image bearing member;
   an image forming unit configured to form an image on the image bearing member;
   a light emission unit;
   a measurement unit configured to measure reflected light from a measurement image formed on the image bearing member;

a controller configured to control the image forming unit to form measurement images, to control the light emission unit to emit light, to control the measurement unit to measure reflected light from the measurement images, and to generate an image formation condition based on measurement results of the measurement images and information related to a measurement result of the image bearing member, wherein the controller controls the light emission unit to emit light based on a first measurement condition, and controls the measuring unit to measure the reflected light from the image bearing member, and determines first information corresponding to the first measurement condition based on the measurement result of the image bearing member, wherein the controller determines second information corresponding to a second measurement condition based on the first measurement condition, the first information, and the second measurement condition, wherein light intensity corresponding to the second measurement condition is more than light intensity corresponding to the first measurement condition, wherein the controller controls the light emission unit to emit light based on the first measurement condition in a case where the measurement unit measures a first measurement image based on the first measurement condition, and generates the image forming condition based on a measurement result of the first measurement image and the first information, and wherein the controller controls the light emission unit to emit light based on the second measurement condition in a case where the measurement unit measures a second measurement image based on the second measurement condition, and generates the image forming condition based on a measurement result of the second measurement image and the second information.

2. The image forming apparatus according to claim 1, wherein the controller controls the image forming unit to form a plurality of measurement images of which gradations are different, and wherein the controller selects a measurement condition based on the gradation.

3. The image forming apparatus according to claim 1, wherein the image forming unit forms the first measurement image corresponding to a first gradation range, and wherein the image forming unit forms the second measurement image corresponding to a second gradation range that is higher than the first gradation range.

4. The image forming apparatus according to claim 1, wherein the controller generates a first image forming condition for correcting a gradation characteristic of an image that the image forming unit will form based on the measurement result of the first measurement image and the first information, and wherein the controller generates a second image forming condition for adjusting maximum density of an image that the image forming unit will form based on the measurement result of the second measurement image and the second information.

5. The image forming apparatus according to claim 1, wherein the controller controls a signal value input into the light emission unit in order to adjust a measurement condition.

6. The image forming apparatus according to claim 1, wherein the controller determines the first information based on one-round measurement result of the image bearing member.

7. The image forming apparatus according to claim 1, further comprising a sensor that detects a mark attached to the image bearing member, wherein the controller determines the first information based on a detection result of the mark by the sensor.

8. The image forming apparatus according to claim 1, further comprising a conversion unit configured to convert image data based on a conversion condition, wherein the image forming condition corresponds to the conversion condition.

9. The image forming apparatus according to claim 1, wherein the controller divides the measurement result of the first measurement image by the first information, and generates the image forming condition based on a calculated result, and wherein the controller divides the measurement result of the second measurement image by the second information, and generates the image forming condition based on a calculated result.

10. A control method for an image forming apparatus that forms an image on a sheet, the control method comprising:

controlling an image forming unit to form a measurement image on an image bearing member;

controlling a light emission unit to emit light;

controlling a measurement unit to measure reflected light from the measurement image;

generating an image forming condition based on a measurement result of the measurement image and information related to a measurement result of the image bearing member, wherein the measurement unit measures light emitted from the light emission unit based on a first measurement condition and is reflected from the image bearing member, and first information corresponding to the first measurement condition is generated based on the measurement result of the image bearing member, wherein second information corresponding to a second measurement condition is determined based on the first measurement condition, the first information, and the second measurement condition, wherein light intensity corresponding to the second measurement condition is more than light intensity corresponding to the first measurement condition, wherein the light emission unit emits light based on the first measurement condition in a case where the measurement unit measures a first measurement image based on the first measurement condition, and the image forming condition is generated based on a measurement result of the first measurement image and the first information, and wherein the light emission unit emits light based on the second measurement condition in a case where the measurement unit measures a second measurement image based on the second measurement condition, and the image forming condition is generated based on a measurement result of the second measurement image and the second information.

* * * * *